(12) United States Patent
Lietzau et al.

(10) Patent No.: US 11,542,433 B2
(45) Date of Patent: Jan. 3, 2023

(54) LIQUID CRYSTAL COMPOUNDS

(71) Applicant: MERCK PATENT GMBH, Darmstadt (DE)

(72) Inventors: Lars Lietzau, Rossdorf (DE); Volker Reiffenrath, Rossdorf (DE); Mark Goebel, Winchester (GB)

(73) Assignee: MERCK PATENT GMBH, Darmstadt (DE)

( * ) Notice: Subject to any disclaimer, the term of this patent is extended or adjusted under 35 U.S.C. 154(b) by 861 days.

(21) Appl. No.: 16/319,050

(22) PCT Filed: Jul. 17, 2017

(86) PCT No.: PCT/EP2017/067957
§ 371 (c)(1),
(2) Date: Jan. 18, 2019

(87) PCT Pub. No.: WO2018/015321
PCT Pub. Date: Jan. 25, 2018

(65) Prior Publication Data
US 2021/0371749 A1    Dec. 2, 2021

(30) Foreign Application Priority Data
Jul. 20, 2016    (EP) ..................................... 16180332

(51) Int. Cl.
| C09K 19/12 | (2006.01) |
| C09K 19/02 | (2006.01) |
| G02F 1/137 | (2006.01) |
| G02F 1/13 | (2006.01) |

(52) U.S. Cl.
CPC .............. *C09K 19/12* (2013.01); *C09K 19/02* (2013.01); *G02F 1/13* (2013.01); *G02F 1/137* (2013.01); *C09K 2019/122* (2013.01); *C09K 2019/123* (2013.01); *C09K 2323/00* (2020.08)

(58) Field of Classification Search
CPC .. C09K 19/12; C09K 19/02; C09K 2019/122; C09K 2019/123; C09K 2323/00; G02F 1/13; G02F 1/137
USPC ...................................... 428/1.1; 252/299.66
See application file for complete search history.

(56) References Cited

U.S. PATENT DOCUMENTS

| 5,714,087 | A | 2/1998 | Pausch et al. |
| 6,569,505 | B2 | 5/2003 | Poetsch et al. |
| 7,553,522 | B2 | 6/2009 | Heckmeier et al. |
| 8,129,002 | B2 | 3/2012 | Kirsch et al. |
| 9,499,745 | B2 | 11/2016 | Yanai et al. |
| 10,048,420 | B2 | 8/2018 | Adlem et al. |
| 2002/0142108 | A1 | 10/2002 | Poetsch et al. |
| 2006/0263542 | A1 | 11/2006 | Kirsch et al. |
| 2010/0073621 | A1 | 3/2010 | Shimada |
| 2015/0184076 | A1 | 7/2015 | Kaneoya et al. |
| 2015/0323722 | A1 | 11/2015 | Adlem et al. |

FOREIGN PATENT DOCUMENTS

| CN | 1908117 | B | 3/2013 |
| CN | 101616883 | B | 6/2014 |
| CN | 103254910 | B | 4/2015 |
| CN | 104745202 | A | 7/2015 |
| CN | 104837955 | A | 8/2015 |
| CN | 104003852 | B | 4/2016 |
| DE | 1947600 | A1 | 4/1970 |
| DE | 4325985 | A1 | 2/1995 |
| DE | 102006033886 | A1 | 2/2007 |
| EP | 1126006 | B1 | 3/2009 |
| GB | 1266170 | A | 3/1972 |
| JP | 9221441 | A2 | 8/1997 |
| TW | 200526765 | A | 8/2005 |
| TW | 201444956 | A | 12/2014 |
| WO | 9109008 | A1 | 6/1991 |
| WO | 9504789 | A1 | 2/1995 |
| WO | 05019377 | A1 | 3/2005 |
| WO | 14094949 | A1 | 6/2014 |

OTHER PUBLICATIONS

Erik B. Pinxterhuis et al: "Fast, greener and scalable direct coupling of organolithium compounds with no additional solvents", Nature Communications, vol. 7, Jun. 2, 2016 (Jun. 2, 2016), p. 11698, XP055511504.
Yang Jing-Yun et al: "Copper-mediated trifluoromethylation of diaryliodonium salts with difluoromethyltriflate", Journal of Fluorine Chemistry, Elsevier, NL, vol. 186, Apr. 28, 2016 (Apr. 28, 2016), pp. 45-51, XP029536584, ISSN: 0022-1139.
Jonathan T. Reeves et al: "Room Temperature Palladium-Catalyzed Cross Coupling of Aryltrimethylammonium Triflates with Aryl Grignard Reagents", Organic Letters, vol. 12, Nr. 19, Oct. 1, 2010 (Oct. 1, 2010), pp. 4388-4391, XP055637670, ISSN: 1523-7060.
Search Report in corresponding application EP17748408.6 dated Nov. 6, 2019 (pp. 1-7).
Office action in corresponding Taiwanese Office Action dated Nov. 27, 2020 (pp. 1-7) and English translation thereof (pp. 1-6).

(Continued)

*Primary Examiner* — Ruiyun Zhang
(74) *Attorney, Agent, or Firm* — Millen White Zelano and Branigan, PC; Csaba Henter

(57) ABSTRACT

The invention relates to compounds of the formula I,

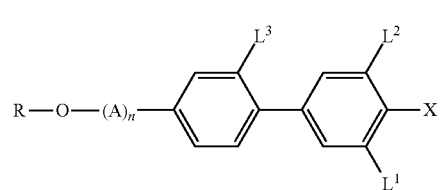

in which
R, A, n, $L^1$, $L^2$, $L^3$ and X have the meanings given in Claim 1, to a process for their preparation, and to liquid-crystalline media comprising at least one compound of the formula I and electro-optical displays containing a liquid-crystalline medium of this type.

18 Claims, No Drawings

(56) References Cited

OTHER PUBLICATIONS

Drzewinski W: nitroarenes—The Simple Way to Liquid Crystalline Fluoroalkyl-aryl Ethers Liquid Crystals, Taylor & FRANCIS, vol. 37, No. 3, Mar. 1, 2010 (Mar. 1, 2010), pp. 335-338.
International Search Report for PCT/EP2017/067957 dated Oct. 17, 2017 (pp. 1-6).
STN Registry search dated Feb. 15, 2022; ACS; pp. 1-29.
Office Action in corresponding CN application 201780044247.5 dated Feb. 25, 2022 (pp. 1-34) and english translation thereof (pp. 1-20).
CAS Registry #1261856-94-3; ACS;Entered STN: Feb. 3, 2011 (1 page).
Office Action in corresponding KR Korean Patent Appln. No. 2019-7004846 dated Jun. 22, 2022 (pp. 1-6) and English translation thereof (pp. 1-6).
STN Registry; CAS Registry #1261440-14-5; ACS, Entered STN: Feb. 2, 2011 (1 page).
STN Registry; CAS Registry #1261478-90-3, ACS, Entered STN: Feb. 2, 2011 (1 page).
STN Registry; CAS Registry #1261655-89-3, ACS, Entered STN: Feb. 2, 2011 (1 page).
Office Action in corresponding CN application 201780044247.5 dated Jul. 15, 2022 (pp. 1-9) and English translation thereof (pp. 1-12).

LIQUID CRYSTAL COMPOUNDS

The invention relates to compounds of the formula I as defined below, to a process for their preparation, to liquid-crystalline media comprising at least one compound of the formula I, and to the use thereof as component(s) in liquid-crystalline media. In addition, the present invention relates to liquid-crystal and electro-optical display elements which contain the liquid-crystalline media according to the invention. The compounds according to the invention contain a characteristically substituted biphenyl group as structural element.

In previous years, the areas of application of liquid-crystalline compounds have been considerably expanded to various types of display devices, electro-optical devices, electronic components, sensors, etc. For this reason, a number of different structures have been proposed, in particular in the area of nematic liquid crystals. The nematic liquid-crystal mixtures have to date found the broadest use in flat-panel display devices. They have been employed, in particular, in passive TN or STN matrix displays or systems having a TFT active matrix.

The liquid-crystalline compounds according to the invention can be used as component(s) of liquid-crystalline media, in particular for displays based on the principle of the twisted cell, the guest-host effect, the effect of deformation of aligned phases DAP or ECB (electrically controlled birefringence), the IPS (in-plane switching) effect or the effect of dynamic scattering.

The use of polar biphenyl derivatives as liquid-crystalline substances is known to the person skilled in the art. Various compounds containing a biphenyl system have already been described as liquid-crystalline or mesogenic material, as has the preparation thereof, such as, for example, in the specification DE 102006033886 A1.

The present invention was based on the object of finding novel stable compounds which are suitable as component(s) of liquid-crystalline media. In particular, the compounds should simultaneously have a comparatively low viscosity as well as high optical anisotropy. For many current mixture concepts in the area of liquid crystals, it is advantageous to use compounds having positive dielectric anisotropy $\Delta\varepsilon$ in combination with high optical anisotropy.

In view of the very wide variety of areas of application of compounds of this type having high $\Delta n$, it was desirable to have available further compounds, preferably having high nematogeneity, which have properties which are precisely tailored to the respective applications.

The invention was thus based firstly on the object of finding novel stable compounds which are suitable as component(s) of liquid-crystalline media, in particular for, for example, TN, STN, IPS and TN-TFT displays.

A further object of the present invention was to provide compounds which, per se or in mixtures, have high optical anisotropy $\Delta n$, a high clearing point and low rotational viscosity $\gamma_1$. In addition, the compounds according to the invention should be thermally and photochemically stable under the conditions prevailing in the areas of application. Furthermore, the compounds according to the invention should if possible have a broad nematic phase. As mesogens, they should facilitate a broad nematic phase in mixtures with liquid-crystalline co-components and be readily miscible with nematic base mixtures, in particular at low temperatures. Preference is likewise given to substances having a low melting point and a low enthalpy of melting, since these quantities are in turn a sign of the desirable properties mentioned above, such as, for example, high solubility, a broad liquid-crystalline phase and a low tendency towards spontaneous crystallisation in mixtures at low temperatures. In particular, the solubility at low temperature while avoiding any crystallisation is important for safe operation and transport of displays in vehicles and aircraft and outdoors.

Surprisingly, it has been found that the compounds according to the invention are eminently suitable as components of liquid-crystalline media. They can be used to obtain liquid-crystalline media for displays which require particularly high dielectric anisotropies, in particular for TN-TFT and STN displays, but also for IPS systems or more recent concepts. The compounds according to the invention are surprisingly stable and colourless. They are also distinguished by high optical anisotropies $\Delta n$, owing to which lower layer thicknesses and thus lower threshold voltages are necessary when used in optical switching elements. They have good solubility for compounds having comparable properties. In addition, the compounds according to the invention have a comparatively very high clearing point and at the same time low values for the rotational viscosity. The compounds have relatively low melting points.

The provision of the compounds according to the invention very generally considerably broadens the range of liquid-crystalline substances which are suitable, from the various applicational points of view, for the preparation of liquid-crystalline mixtures.

The compounds according to the invention have a broad range of applications. Depending on the choice of substituents, these compounds can serve as base materials of which liquid-crystalline media are predominantly composed. However, it is also possible to add liquid-crystalline base materials from other classes of compound to the compounds according to the invention in order, for example, to influence the dielectric and/or optical anisotropy of a dielectric of this type and/or to optimise its threshold voltage and/or its viscosity.

The invention thus relates to compounds of the formula I,

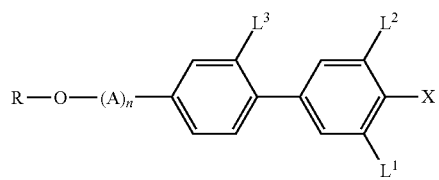

in which
X denotes CN, $CF_3$, SCN, —C≡C—$CF_3$ or —CH═CH—$CF_3$,
R denotes a halogenated or unsubstituted alkyl radical having 1 to 15 C atoms, where, in addition, one or more $CH_2$ groups in these radicals may each be replaced, independently of one another, by —C≡C— or —CH═CH—,
A denotes 1,4-phenylene, in which one or two CH groups may be replaced by N and in which, in addition, one or more H atoms may be replaced by Cl, F, CN, methyl, methoxy or a mono- or polyfluorinated methyl or methoxy group, or 2,6-naphthyl, in which, in addition, one or more H atoms may be replaced by Cl, F, CN, methyl, methoxy or a mono- or polyfluorinated methyl or methoxy group,
$L^1$, $L^2$ and $L^3$, independently of one another, denote H or F, and
n denotes 0, 1, 2 or 3.

The invention furthermore relates to the use of the compounds of the formula I in liquid-crystalline media.

The present invention likewise relates to liquid-crystalline media having at least two liquid-crystalline components which comprise at least one compound of the formula I.

The compounds of the formula I have a broad range of applications. Depending on the choice of substituents, these compounds can serve as base materials of which liquid-crystalline media are predominantly composed; however, it is also possible to add liquid-crystalline base materials from other classes of compound to the compounds of the formula I in order, for example, to influence the dielectric and/or optical anisotropy of a dielectric of this type and/or to optimise its threshold voltage and/or its viscosity.

In the pure state, the compounds of the formula I are colourless and, per se or in mixtures, form liquid-crystalline mesophases in a temperature range which is favourably located for electro-optical use. The compounds according to the invention enable broad nematic phase ranges to be achieved. In liquid-crystalline mixtures, the substances according to the invention significantly increase the optical anisotropy and/or result in an improvement in the low-temperature storage stability compared with comparable compounds having high dielectric anisotropy. At the same time, the compounds are distinguished by good UV stability.

The group A preferably denotes

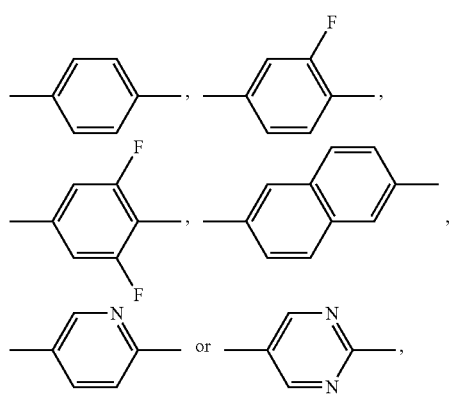

particularly preferably

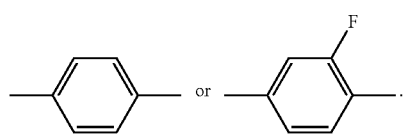

The radical R preferably denotes alkyl or alkenyl having up to 8 carbon atoms. R particularly preferably denotes unbranched alkyl having 1 to 7 C atoms.

The radical X preferably denotes $CF_3$, —SCN, —C≡C—$CF_3$ or —CH=CH—$CF_3$, particularly preferably $CF_3$. The radical —CH=CH—$CF_3$ is preferably in the trans configuration.

Compounds of the formula I containing branched or substituted wing groups R may occasionally be of importance owing to better solubility in the conventional liquid-crystalline base materials. The group R is preferably straight-chain.

Preference is given to compounds of the formula I in which $L^3$ denotes fluorine. Preference is furthermore given to compounds of the formula I in which $L^1$ denotes F, in particular in which $L^1$ and $L^2$ denote F.

Preference is given to compounds of the formula I in which n is 0 or 1, and particularly preferably n=0.

Preference is therefore given to compounds of the formula IA

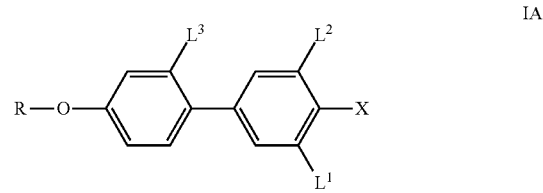

in particular those in which $X=CF_3$ and $L^1=F$.

The radical R is particularly preferably selected from the moieties:

—$CH_3$

—$C_2H_5$

—$C_3H_7$

—$C_4H_9$

—$CH_2$—CH=$CH_2$

—$CH_2$—CH=CH—$CH_3$

Particularly preferred compounds of the formula I are the compounds of the formulae I1 to I5,

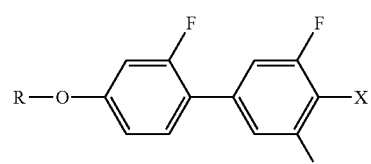

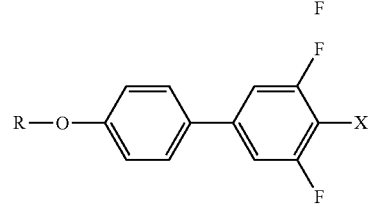

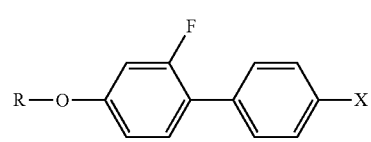

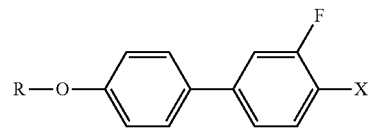

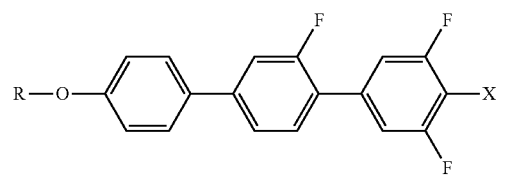

in which R and X independently have the meanings indicated above, in particular the preferred meanings or combinations thereof. Of the compounds of the formulae I1 to I5, the compounds of the formulae I1, I2, I3 and I4 are preferred, in particular the compounds of the formulae I1 and I3.

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

Compounds of the formula I can advantageously be prepared as evident from the following illustrative synthesis and the examples (Scheme 1):

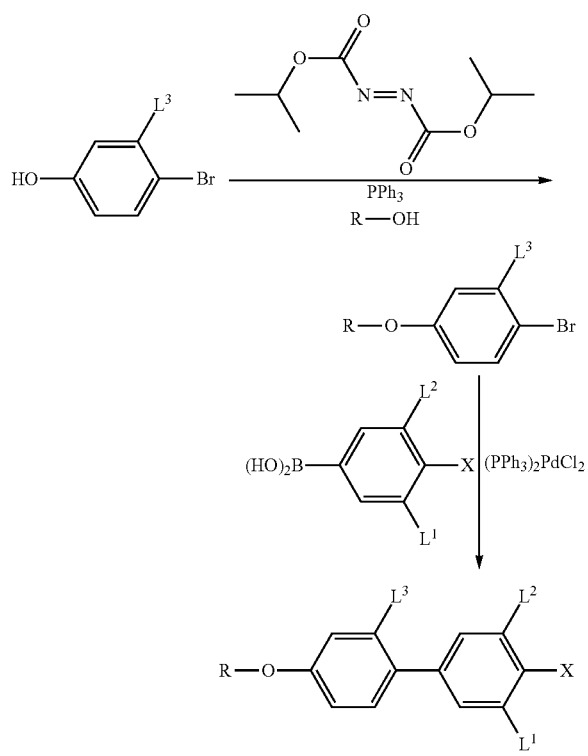

Scheme 1. General synthetic scheme for the preparation of compounds of the formula I. The starting compound may be extended by a group A or (A)$_n$ analogously to the formula I. X denotes a radical X as in formula I or an (optionally ketal-protected) aldehyde group.

The two polar end groups —CH=CH—CF$_3$ and —C≡C—CF$_3$ can be prepared as follows:

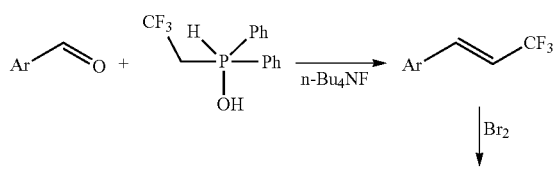

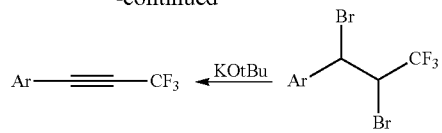

Scheme 2. Synthesis of the end groups X=—CH=CH—CF$_3$ and —C≡C—CF$_3$; Ar denotes the substituted biphenyl radical of the compounds of the formula I. In the first step, a molecular sieve is preferably added in order to absorb water.

Corresponding starting materials can generally readily be prepared by the person skilled in the art by synthetic methods known from the literature. The synthesis of the boron acid derivatives is carried out, for example, by metallation of corresponding halogen compounds and subsequent reaction with suitable electrophilic boron compounds, such as, for example, trialkyl borates. Hydrolysis gives the boronic acids for Suzuki coupling to aryl bromides.

Instead of the aryl bromides shown, it is also possible to use iodides, chlorides or leaving groups having comparable reactivity (for example the triflate group).

The invention therefore also relates to a process for the preparation of compounds of the formula I which includes a reaction step in which a boronic acid of the formula IIA or an open-chain or cyclic boronic acid ester of the formula IIB

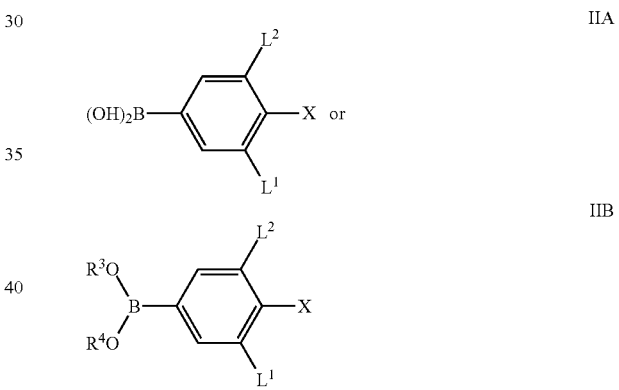

in which X, L$^1$ and L$^2$ are defined as for formula I, and
R$^3$, R$^4$ denote an alkyl having 1-12 C atoms or R$^3$+R$^4$ together also denote a 2-10 C alkylene, in particular of the formulae —CH$_2$—(CH$_2$)$_p$—CH$_2$— and —C(CH$_3$)$_2$C(CH$_3$)$_2$—, where p is 0 or 1 or denote 1,2-phenylene, where phenylene, R$^3$, R$^4$ and R$^3$+R$^4$ may also be substituted, is reacted with a compound of the formula III

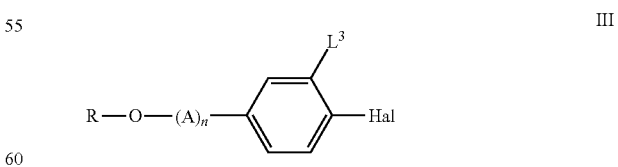

in which
R, A, L$^3$ and n independently are defined as for formula I and
Hal denotes Cl, Br, I or O(SO$_2$)CF$_3$,
in the presence of a transition-metal catalyst to give a compound of the formula I or a precursor thereof.

The transition-metal catalyst is preferably a palladium complex in oxidation state 0, II or IV. The reaction is preferably carried out in the homogeneous phase with a soluble catalyst. The complexes are particularly preferably bis(triphenylphosphine)palladium(II) chloride. The reaction methods and reagents used are in principle known from the literature. Further reaction conditions are revealed by the working examples.

An alternative to the process described consists in replacing the reactive groups of the reactants (boronic acid and halide).

Further preferred process variants, not mentioned above, are revealed by the examples or the claims.

The invention also relates to liquid-crystalline media comprising one or more of the compounds of the formula I according to the invention. The liquid-crystalline media comprise at least two components. They are preferably obtained by mixing the components with one another. A process according to the invention for the preparation of a liquid-crystalline medium is therefore characterised in that at least one compound of the formula I is mixed with at least one further mesogenic compound, and additives are optionally added.

The achievable combinations of clearing point, viscosity at low temperature, thermal and UV stability and dielectric anisotropy are far superior to the previous materials from the prior art.

The liquid-crystalline media according to the invention preferably comprise 2 to 40, particularly preferably 4 to 30, components as further constituents besides one or more compounds according to the invention. In particular, these media comprise 7 to 25 components besides one or more compounds according to the invention. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid or of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexanes, 1,4-biscyclohexylbenzenes, 4,4'-biscyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most important compounds suitable as further constituents of the media according to the invention can be characterised by the formulae 1, 2, 3, 4 and 5:

R'-L-E-R"  1

R'-L-COO-E-R"  2

R'-L-CF$_2$O-E-R"  3

R'-L-CH$_2$CH$_2$-E-R"  4

R'-L-C≡C-E-R"  5

In the formulae 1, 2, 3, 4 and 5, L and E, which may be identical or different, each, independently of one another, denote a divalent radical from the group formed by the structural elements -Phe-, -Cyc-, -Phe-Phe-, -Phe-Cyc-, -Cyc-Cyc-, -Pyr-, -Dio-, -Py-, -G-Phe-, -G-Cyc- and their mirror images, where Phe denotes unsubstituted or fluorine-substituted 1,4-phenylene, Cyc denotes trans-1,4-cyclohexylene, Pyr denotes pyrimidine-2,5-diyl or pyridine-2,5-diyl, Dio denotes 1,3-dioxane-2,5-diyl, Py denotes tetrahydropyran-2,5-diyl and G denotes 2-(trans-1,4-cyclohexyl)ethyl.

One of the radicals L and E is preferably Cyc, Phe or Pyr. E is preferably Cyc, Phe or Phe-Cyc. The media according to the invention preferably comprise one or more components selected from the compounds of the formulae 1, 2, 3, 4 and 5 in which L and E are selected from the group consisting of Cyc, Phe and Pyr and simultaneously one or more components selected from the compounds of the formulae 1, 2, 3, 4 and 5 in which one of the radicals L and E is selected from the group consisting of Cyc, Phe, Py and Pyr and the other radical is selected from the group consisting of -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group consisting of -Phe-Cyc-, -Cyc-Cyc-, -G-Phe- and -G-Cyc-.

R' and/or R" each, independently of one another, denote alkyl, alkenyl, alkoxy, alkoxyalkyl, alkenyloxy or alkanoyloxy having up to 8 C atoms, —F, —Cl, —CN, —NCS or —(O)$_i$CH$_{3-k}$F$_k$, where i is 0 or 1 and k is 1, 2 or 3.

In a smaller sub-group of the compounds of the formulae 1, 2, 3, 4 and 5, R' and R" each, independently of one another, denote alkyl, alkenyl, alkoxy, alkoxyalkyl, alkenyloxy or alkanoyloxy having up to 8 C atoms. This smaller sub-group is called group A below, and the compounds are referred to by the sub-formulae 1a, 2a, 3a, 4a and 5a. In most of these compounds, R' and R" are different from one another, one of these radicals usually being alkyl, alkenyl, alkoxy or alkoxyalkyl.

In another smaller sub-group of the compounds of the formulae 1, 2, 3, 4 and 5, which is referred to as group B, R" denotes —F, —Cl, —NCS or —(O)$_i$CH$_{3-k}$F$_k$, where i is 0 or 1 and k is 1, 2 or 3. The compounds in which R" has this meaning are referred to by the sub-formulae 1b, 2b, 3b, 4b and 5b. Particular preference is given to those compounds of the sub-formulae 1b, 2b, 3b, 4b and 5b in which R" has the meaning —F, —Cl, —NCS, —CF$_3$, —OCHF$_2$ or —OCF$_3$.

In the compounds of the sub-formulae 1b, 2b, 3b, 4b and 5b, R' has the meanings indicated in the case of the compounds of the sub-formulae 1a to 5a and is preferably alkyl, alkenyl, alkoxy or alkoxyalkyl.

In a further smaller sub-group of the compounds of the formulae 1, 2, 3, 4 and 5, R" denotes —CN. This sub-group is referred to below as group C, and the compounds of this sub-group are correspondingly described by sub-formulae 1c, 2c, 3c, 4c and 5c. In the compounds of the sub-formulae 1c, 2c, 3c, 4c and 5c, R' has the meanings indicated in the case of the compounds of the sub-formulae 1a to 5a and is preferably alkyl, alkoxy or alkenyl.

Besides the preferred compounds of groups A, B and C, other compounds of the formulae 1, 2, 3, 4 and 5 having other variants of the proposed substituents are also customary. All these substances are obtainable by methods which are known from the literature or analogously thereto.

Besides compounds of the formula I according to the invention, the media according to the invention preferably comprise one or more compounds selected from groups A, B and/or C. The proportions by weight of the compounds from these groups in the media according to the invention are preferably:

group A: 0 to 90%, preferably 20 to 90%, particularly preferably 30 to 90%;
group B: 0 to 80%, preferably 10 to 80%, particularly preferably 10 to 65%;
group C: 0 to 80%, preferably 0 to 80%, particularly preferably 0 to 50%;

where the sum of the proportions by weight of the group A, B and/or C compounds present in the respective media according to the invention is preferably 5 to 90% and particularly preferably 10 to 90%.

The media according to the invention preferably comprise 1 to 40%, particularly preferably 5 to 30%, of the compounds according to the invention.

The liquid-crystal mixtures according to the invention are prepared in a manner which is conventional per se. In general, the desired amount of the components used in lesser amount is dissolved in the components making up the principal constituent, preferably at elevated temperature. It is also possible to mix solutions of the components in an organic solvent, for example in acetone, chloroform or methanol, and to remove the solvent again, for example by distillation, after thorough mixing. It is furthermore possible to prepare the mixtures in other conventional manners, for example by using premixes, for example homologue mixtures, or using so-called "multibottle" systems.

The dielectrics may also comprise further additives known to the person skilled in the art and described in the literature. For example, 0 to 15%, preferably 0 to 10%, of pleochroic dyes, chiral dopants, stabilisers or nanoparticles can be added. The individual compounds added are employed in concentrations of 0.01 to 6%, preferably 0.1 to 3%. However, the concentration data of the other constituents of the liquid-crystal mixtures, i.e. the liquid-crystalline or mesogenic compounds, are given here without taking into account the concentration of these additives.

The liquid-crystal mixtures according to the invention enable a significant broadening of the available parameter latitude.

The invention also relates to electro-optical displays (in particular TFT displays having two plane-parallel outer plates, which, together with a frame, form a cell, integrated non-linear elements for switching individual pixels on the outer plates, and a nematic liquid-crystal mixture having positive dielectric anisotropy and high specific resistance located in the cell) which contain media of this type, and to the use of these media for electro-optical purposes.

The expression "alkyl" encompasses unbranched and branched alkyl groups having 1-9 carbon atoms, in particular the unbranched groups methyl, ethyl, propyl, butyl, pentyl, hexyl and heptyl. Groups having 2-5 carbon atoms are generally preferred.

The expression "alkenyl" encompasses unbranched and branched alkenyl groups having up to 9 carbon atoms, in particular the unbranched groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The expression "halogenated alkyl radical" preferably encompasses mono- or polyfluorinated and/or -chlorinated radicals. Perhalogenated radicals are included. Particular preference is given to fluorinated alkyl radicals, in particular $CF_3$, $CH_2CF_3$, $CH_2CHF_2$, $CHF_2$, $CH_2F$, $CHFCF_3$ and $CF_2CHFCF_3$. The expression "halogenated alkenyl radical" and related expressions are explained correspondingly.

The total amount of compounds of the formula I in the mixtures according to the invention is not crucial. The mixtures may therefore comprise one or more further components for the purposes of optimisation of various properties.

The construction of the matrix display according to the invention from polarisers, electrode base plates and surface-treated electrodes corresponds to the usual design for displays of this type. The term usual design is broadly drawn here and also encompasses all derivatives and modifications of the matrix display, in particular also matrix display elements based on poly-Si TFTs.

A significant difference between the displays according to the invention and the hitherto conventional ones based on the twisted nematic cell consists, however, in the choice of the liquid-crystal parameters of the liquid-crystal layer.

The following examples are intended to explain the invention without restricting it. The person skilled in the art will be able to glean from the examples working details that are not given in detail in the general description, generalise them in accordance with general expert knowledge and apply them to a specific problem.

Above and below, percentage data denote percent by weight. All temperatures are indicated in degrees Celsius. Furthermore, C=crystalline state, N=nematic phase, Sm=smectic phase, Tg=glass-transition temperature and I=isotropic phase. The data between these symbols represent the transition temperatures. Δn denotes optical anisotropy (589 nm, 20° C.), Δε the dielectric anisotropy (1 kHz, 20° C.) and $γ_1$ the rotational viscosity (20° C.; in the unit mPa·S).

The physical, physicochemical and electro-optical parameters are determined by generally known methods, as described, inter alia, in the brochure "Merck Liquid Crystals—Licristal®—Physical Properties of Liquid Crystals—Description of the Measurement Methods", 1998, Merck KGaA, Darmstadt.

The dielectric anisotropy Δε of the individual substances is determined at 20° C. and 1 kHz. To this end, 5-10% by weight of the substance to be investigated are measured dissolved in the dielectrically positive mixture ZLI-4792 (Merck KGaA), and the measurement value is extrapolated to a concentration of 100%. The optical anisotropy Δn is determined at 20° C. and a wavelength of 589.3 nm, the rotational viscosity $γ_1$ at 20° C., both likewise by linear extrapolation.

In the present application, unless expressly indicated otherwise, the plural form of a term denotes both the singular form and the plural form, and vice versa. Further combinations of the embodiments and variants of the invention in accordance with the description also arise from the appended claims.

The following abbreviations are used:
MTB ether methyl tert-butyl ether
THF tetrahydrofuran

EXAMPLE 1

Step 1

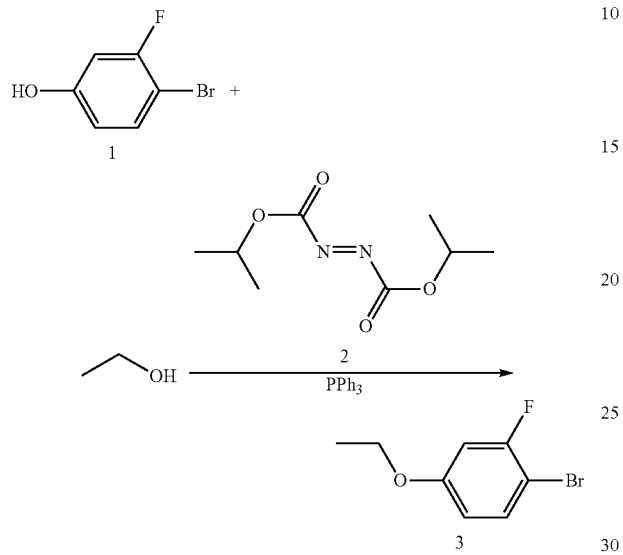

The phenol 1, ethanol and triphenylphosphine (1 eq. each) are dissolved in THF, and the diazo compound 2 is added at a temperature below 30° C. The reaction mixture is subsequently stirred at room temperature for 12 h. The solvent is removed, and the residue is stirred with a mixture of toluene and n-heptane (9/1). The solid which forms is separated off, and the filtrate is passed through silica gel (toluene/n-heptane (9/1)). Yield 85%.

Step 2: 4'-Ethoxy-3,5,2'-4-trifluoromethylbiphenyl

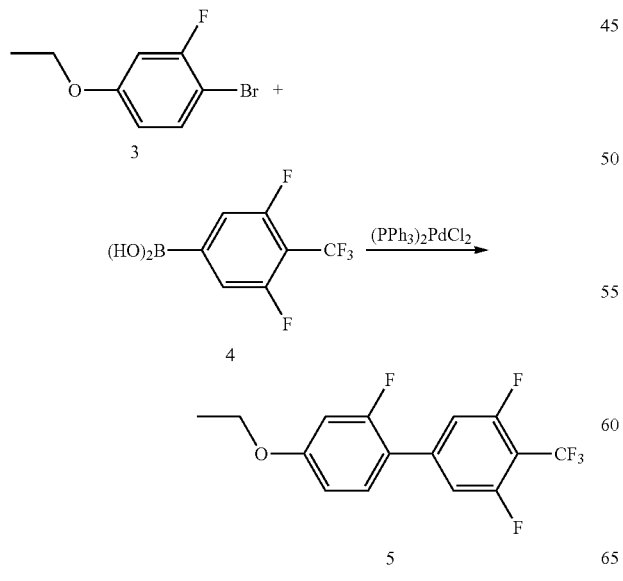

THF, the catalyst (0.01 eq.) and a solution of 2 eq. of sodium metaborate tetrahydrate in water are added to the ether 3 and the boronic acid 4 (1 eq. each). After addition of hydrazine hydroxide (0.03 eq.), the mixture is heated under reflux for 4 h. MTB ether is subsequently added to the cooled reaction mixture. The separated-off organic phase is washed with water, dried over sodium sulfate and evaporated. The residue is passed though silica gel (chlorobutane). Yield: 70%.

C 45 I $\Delta\varepsilon=28$ $\Delta n=0.096$ $\gamma_1=33$ mPa·s

The following are prepared analogously or comparably:

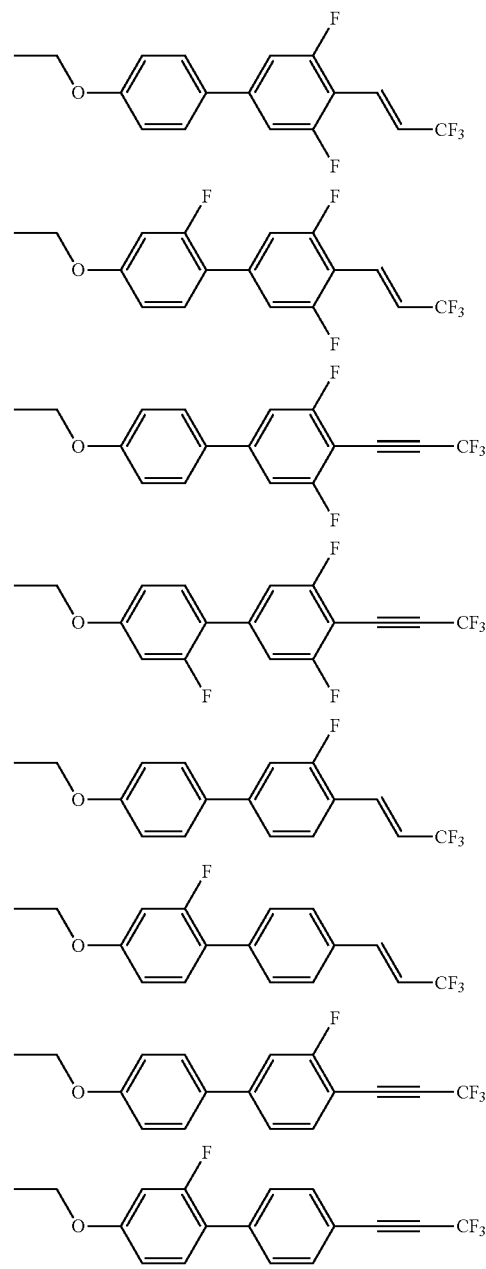

-continued

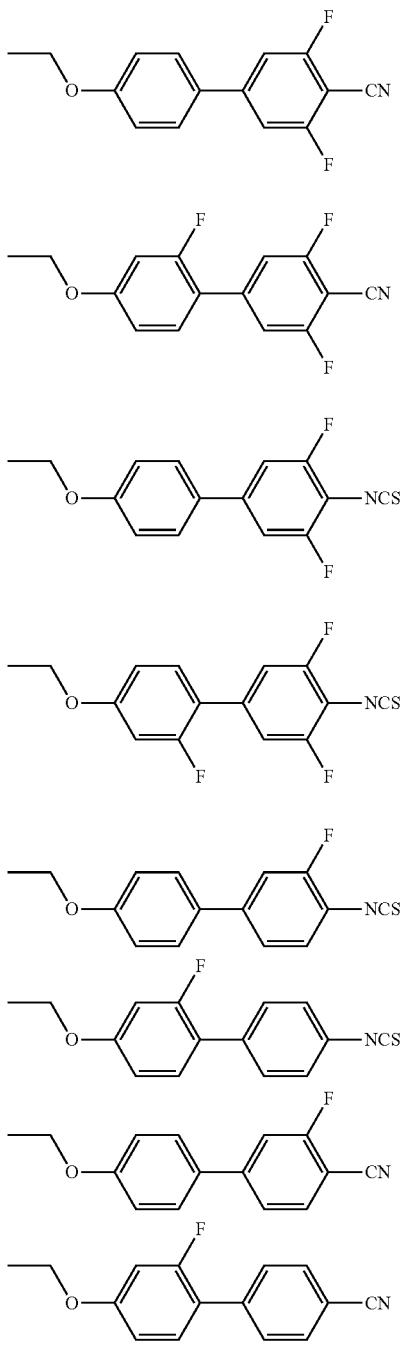

FURTHER EXAMPLES

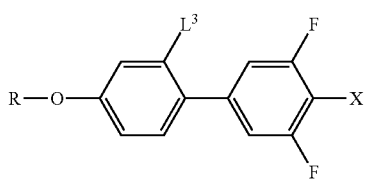

TABLE 1

Illustrative compounds and measurement values

| No. | R | L³ | X | Δε | Δn | γ₁ [mPas] | Phase |
|---|---|---|---|---|---|---|---|
| 2 | CH₃ | F | CF₃ | 25 | 0.086 | 27 | C 49 I |
| 3 | C₂H₅ | H | CF₃ | 25 | 0.137 | 38 | C 54 I |
| 4 | C₂H₅ | F | CF₃ | 28 | 0.096 | 33 | C 45 I |
| 5 | C₃H₇ | H | CF₃ | 24 | 0.116 | 37 | C46 I |
| 6 | C₃H₇ | F | CF₃ | 26 | 0.087 | 35 | Tg −66 C 27 I |
| 7 | C₄H₉ | H | CF₃ | 22 | 0.119 | 45 | C 48 I |
| 8 | C₄H₉ | F | CF₃ | 24 | 0.079 | 42 | C 21 I |
| 9 | CH₂CH=CH₂ | H | CF₃ | 20 | 0.120 | 35 | C 27 I |
| 10 | CH₂CH=CH₂ | F | CF₃ | 23 | 0.104 | 31 | C 22 I |
| 11 | CH₂CH=CHCH₃ | H | CF₃ | 24 | 0.147 | 58 | C 76 I |
| 12 | CH₂CH=CHCH₃ | F | CF₃ | 28 | 0.1221 | 52 | C 35 I |

EXAMPLE 13

$C_3H_7$—O—[structure]—$CF_3$

C 100 SmA (94) I
$\Delta\varepsilon=28$
$\Delta n=0.234$
$\gamma_1=401$ mPa·s

Further embodiments and variants of the invention in accordance with the description also arise from the following claims or from combinations of more than one of these claims.

The invention claimed is:

1. A compound of formula I1, I2 or I4

[structure I1]

[structure I2]

[structure I4]

in which
X denotes $CF_3$, —C≡C—$CF_3$ or —CH=CH—$CF_3$, and
R denotes an unsubstituted alkyl radical having 1 to 15 C atoms, in which one or more CH₂ groups are optionally each replaced, independently of one another, by —C≡C— or —CH═CH—.

2. The compound according to claim 1, wherein R denotes alkyl or alkenyl having up to 8 carbon atoms.

3. The compound according to claim 1, wherein X denotes $CF_3$.

4. A liquid-crystalline medium comprising at least two mesogenic compounds, one of which is at least one compound of formula I1, I2 or I4 according to claim 1.

5. An electro-optical liquid-crystal display containing a liquid-crystalline medium according to claim 4.

6. The compound according to claim 1, which is a compound of formula I1.

7. The compound according to claim 1, which is a compound of formula I2.

8. The compound according to claim 1, which is a compound of formula I4.

9. A liquid-crystalline medium comprising at least two mesogenic compounds, one of which is at least one compound of formula I1 according to claim 1.

10. A liquid-crystalline medium comprising at least two mesogenic compounds, one of which is at least one compound of formula I2 according to claim 1.

11. A liquid-crystalline medium comprising at least two mesogenic compounds, one of which is at least one compound of formula I3 or I4

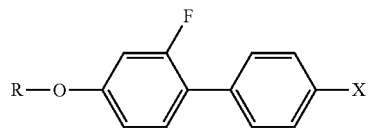

I3

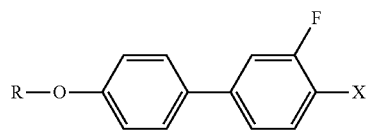

I4 in which
X denotes $CF_3$, —C≡C—$CF_3$ or —CH═CH—$CF_3$, and
R denotes a halogenated or unsubstituted alkyl radical having 1 to 15 C atoms, in which one or more $CH_2$ groups are optionally each replaced, independently of one another, by —C≡C— or —CH═CH—.

12. A liquid-crystalline medium comprising at least two mesogenic compounds, one of which is at least one compound of formula I3 according to claim 11.

13. A liquid-crystalline medium comprising at least two mesogenic compounds, one of which is at least one compound of formula I4 according to claim 11.

14. A liquid-crystalline medium comprising at least two mesogenic compounds, one of which is at least one compound of formula I1 according to claim 1, in which the at least one compound of formula I1 is present at 5 to 30%.

15. A liquid-crystalline medium comprising at least two mesogenic compounds, one of which is at least one compound of formula I2 according to claim 1, in which the at least one compound of formula I2 is present at 5 to 30%.

16. A liquid-crystalline medium comprising at least two mesogenic compounds, one of which is at least one compound of formula I3 according to claim 11, in which the at least one compound of formula I3 is present at 5 to 30%.

17. A liquid-crystalline medium comprising at least two mesogenic compounds, one of which is at least one compound of formula I4 according to claim 11, in which the at least one compound of formula I4 is present at 5 to 30%.

18. A process for preparing a compound of formula I1, I2 or I4 according to claim 1, comprising reacting a boronic acid of formula IIA or an open-chain or cyclic boron acid ester of formula IIB

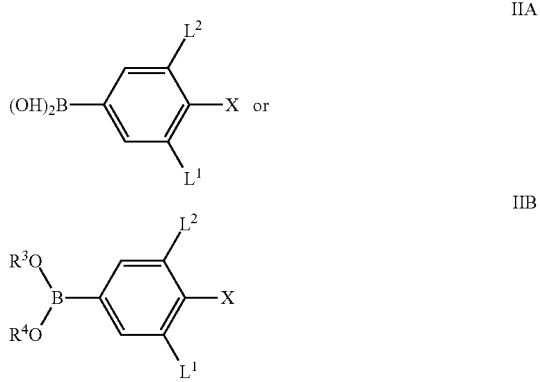

in which
X denotes $CF_3$, —C≡C—$CF_3$ or —CH═CH—$CF_3$,
$L^1$, $L^2$ independently of one another, denote H or F, and
$R^3$, $R^4$ denote an alkyl having 1-12 C atoms or $R^3$+$R^4$ together denote an alkylene, or denote 1,2-phenylene, where phenylene, $R^3$, $R^4$ and $R^3$+$R^4$ are optionally substituted,
with a compound of formula III

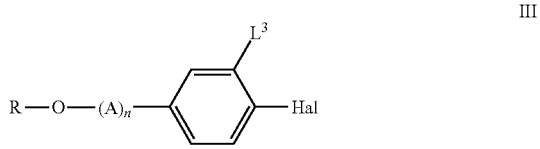

III in which
R denotes an unsubstituted alkyl radical having 1 to 15 C atoms, in which one or more $CH_2$ groups are optionally each replaced, independently of one another, by —C≡C— or —CH═CH—,
A in each case independently denotes 1,4-phenylene, in which one or two CH groups are optionally replaced by N and in which one or more H atoms are optionally replaced by Cl, F, CN, methyl, methoxy or a mono- or polyfluorinated methyl or methoxy group, or 2,6-naphthyl, in which one or more H atoms are optionally replaced by Cl, F, CN, methyl, methoxy or a mono- or polyfluorinated methyl or methoxy group,
n is 0,
$L^3$ denotes H or F, and
Hal denotes $O(SO_2)CF_3$, Cl, Br or I,
in the presence of a transition-metal catalyst.

* * * * *